(12) United States Patent
Oishi et al.

(10) Patent No.: US 6,434,933 B1
(45) Date of Patent: Aug. 20, 2002

(54) HYDRAULIC PRESSURE BRAKE DEVICE FOR VEHICLES

(75) Inventors: Masaki Oishi; Michiharu Nishii, both of Toyota; Takashi Kurokawa, Nagoya, all of (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 140 days.

(21) Appl. No.: 09/666,385

(22) Filed: Sep. 20, 2000

(30) Foreign Application Priority Data

Sep. 20, 1999 (JP) .......................................... 11-264829

(51) Int. Cl.[7] .............................................. B60T 13/00
(52) U.S. Cl. ........................................ 60/547.1; 60/593
(58) Field of Search ........................ 60/545, 534, 547.1, 60/574, 593, 431, 433

(56) References Cited

U.S. PATENT DOCUMENTS

| | | | |
|---|---|---|---|
| 3,967,536 A | | 7/1976 | Bach |
| 4,458,490 A | * | 7/1984 | Newhouse .................. 60/547.1 |
| 4,778,225 A | * | 10/1988 | Rudolph et al. ............ 180/197 |
| 4,812,777 A | * | 3/1989 | Shirai ..................... 188/106 P |
| 5,951,119 A | * | 9/1999 | Eckert ........................ 188/356 |

FOREIGN PATENT DOCUMENTS

| | | |
|---|---|---|
| DE | 196 41 821 | 4/1998 |
| JP | 52-4969 | 1/1977 |

* cited by examiner

Primary Examiner—Edward K. Look
Assistant Examiner—Igor Kershteyn
(74) Attorney, Agent, or Firm—Burns, Doane, Swecker & Mathis, LLP

(57) ABSTRACT

A hydraulic pressure brake device is provided with a vacuum boosting device performing a boosting operation and a hydraulic boosting device performing a hydraulic boosting operation. The hydraulic pressure brake device includes a valve device that prohibits the hydraulic boosting operation for the master cylinder piston by the hydraulic boosting device until the vacuum boosting device reaches its boosting limit and allows the hydraulic boosting operation for the master cylinder piston by the hydraulic boosting device when the vacuum boosting device exceeds its boosting limit. A detecting sensor detects the operational condition of the vacuum boosting device and/or the operational condition of the brake pedal. Based on the detected output by the detecting sensor, a pump device for supplying the boosting pressure by the hydraulic boosting device is controlled to be driven.

15 Claims, 6 Drawing Sheets

HYDRAULIC PRESSURE BRAKE DEVICE FOR VEHICLES

This application is based on and claims priority under 35 U.S.C.§119 with respect to Japanese Patent Application No. 11(1999)-264829 filed on Sep. 20, 1999, the entire content of which is incorporated herein by reference.

FIELD OF THE INVENTION

This invention generally relates to a brake device. More particularly, the present invention pertains to a hydraulic pressure brake device for vehicles having a vacuum boosting mechanism and a hydraulic pressure boosting mechanism as a brake booster for actuating a brake master cylinder in response to brake pedal operation.

BACKGROUND OF THE INVENTION

A hydraulic pressure brake device having a vacuum booster and a hydraulic pressure boosting mechanism as a brake booster is disclosed in a Japanese Patent Application published as a Toku-Kai-Sho No. 52 (1977)-4969.

In this device, the vacuum booster and the hydraulic pressure booster are combined as a brake booster for an automobile to output an increased boosted power to assist the generation of the brake pressure upon operation of a brake pedal.

The booster device disclosed in this publication has a reaction force mechanism in each of the vacuum and hydraulic pressure boosters. By using such reaction force mechanisms of this booster device, separate stepped booster ratios can be obtained at a high pressure stage of a braking force and at a lower pressure stage of a braking force, with the stepped booster ratio at the lower pressure stage of a braking force being different from the high pressure stage.

A power steering pump is used as the brake pressure source for this booster. The power steering pump supplies brake pressure to the brake boosters.

Another known type of booster is disclosed in a U.S. Pat. No. 3,967,536. The disclosed brake booster device includes a pneumatic power brake device (vacuum brake force boosting mechanism) and a hydraulic pressure power brake device using a power steering pump as the brake pressure source. The brake booster device further includes an auxiliary brake pressure source which can be used when the engine is stopped. More specifically, the brake booster device includes an electrically operated pump as the auxiliary brake pressure source, a pressure response switch disposed between the power steering gear and the pump to actuate the pump by actuation of the pressure response switch.

In a vehicle with a heavier weight, in order to assure a large braking force in the brake system, a boosting force can be added by a hydraulic brake pressure booster immediately after the boosting force limit of the vacuum assisted booster is reached. It is therefore expected to be frequently used if such device becomes practically usable.

The above mentioned boosters are still complex in structure and not yet practical by reason of, for example, a rather complicated delivery pipe system resulting from the use of the power steering pump as an auxiliary brake pressure source for the brake force boosting pressure source.

When using the pump for the power steering device as the brake pressure source, responsiveness particularly at low temperature operation has to be improved.

Further, the brake pressure of the power steering pump is always supplied during the engine operation due to the characteristics of the power steering device, but is not supplied when the engine stops. It is accordingly necessary to use a larger brake pedal operation force when the engine is stopped. For example, if an engine stops on a steep hill and the vehicle has to be stopped, the driver of the vehicle has to depress the brake pedal with a very strong force.

In other words, the power steering pump does not function as a brake pressure source. Since the power steering pump always generates brake pressure, the durability of the pump itself and related parts may be adversely affected.

Because the device disclosed in the aforementioned U.S. patent will not supply brake pressure to the power steering device when the engine stops, the electrically operated pump is added to be driven. This will lead to an expensive system because of the addition of another pump such as the electrically operated pump and will also lead to a complicated delivery hydraulic piping. Further, a properly controlled system is needed to assure the smooth braking operation especially when the change over operation to the hydraulic pressure boosting is carried out.

SUMMARY OF THE INVENTION

According to one aspect of the invention, a hydraulic pressure brake device includes a master cylinder that supplies brake pressure from a pressure chamber by driving a piston in the master cylinder in the forward direction in response to the depression of the brake pedal, a vacuum boosting device that assists the movement of the piston in the master cylinder using vacuum boosting in response to the depression of the brake pedal, a pump that supplies brake pressure independently of the operation of the master cylinder, and a hydraulic pressure boosting device that assists the movement of the piston of the master cylinder in response to the brake pedal depression by the brake pressure supplied from the pump. A valve mechanism operable between a first condition in which the boosting force reaches the boosting limit of the vacuum boosting device and a second condition in which the boosting force exceeds the boosting limit of the vacuum boosting device. The valve mechanism prohibits the boosting of the master cylinder piston by the hydraulic pressure boosting device in the first condition and permits the boosting of the master cylinder piston by the hydraulic pressure boosting device in the second condition. A detecting mechanism detects the operating condition of the vacuum boosting device and/or the brake pedal depression amount, with the pump being controlled to be driven by condition detected by the detecting mechanism.

The vacuum boosting device can be defined by a housing in which is positioned a movable wall dividing the housing into a constant pressure chamber connected to a vacuum source and a variable pressure chamber connected to atmospheric pressure, a control valve movable with the movable wall and supported on the housing, and a control valve mechanism controlling the communication between the variable pressure chamber and the atmospheric pressure and the communication between the constant pressure chamber and the variable pressure chamber. In addition a driving mechanism is driven to move the master cylinder piston in response to the pressure differential between the constant pressure chamber and the variable pressure chamber caused by the operation of the control valve mechanism. A first transmitting element is disposed between the brake pedal and the master cylinder piston through the valve mechanism and a second transmitting element transmits the operational force of the driving mechanism to the master cylinder piston by the pressure differential between the constant pressure chamber and the variable pressure chamber. The valve mechanism is controlled by the relative movement of the first transmitting element and the second transmitting element, so that when the pressure differential between the constant pressure chamber and the variable pressure chamber is below a predetermined value, the valve mechanism is in the first condition and when the pressure differential between the constant pressure chamber and the variable pressure chamber exceeds the predetermined value the valve mechanism is in the second condition so that the brake pedal and the master cylinder piston are engageable for force transmission through the valve mechanism and the first transmitting element.

In addition, the hydraulic pressure brake device further includes an elastic member disposed between the second transmitting element and the driving mechanism, with the first transmitting element being directly connected to the brake pedal not via the elastic member. The end of the vacuum boosting device can be provided with a larger diameter portion, with a pair of hydraulic chambers being defined between the larger diameter portion to form the hydraulic pressure boosting device. A communication passage hydraulically communicates the pair of hydraulic chambers, with the valve mechanism being formed to open the communication passage when the pressure differential between the constant pressure chamber and the variable pressure chamber is below the predetermined value and to close the communication passage when the pressure differential between the constant pressure chamber and the variable pressure chamber exceeds the predetermined value. The valve mechanism includes a valve seat element provided in a recess formed at the rear end of the master cylinder piston and a valve body formed at the front end of the first transmitting element.

The hydraulic pressure brake device further includes a power piston provided adjacent the vacuum boosting device side of the master cylinder piston, a pair of hydraulic chambers defined by the front and rear sides of the power piston to form the hydraulic pressure boosting device, and a communication passage for effecting communication between the pair of hydraulic chambers. The valve mechanism opens the communication passage when the pressure differential between the constant pressure chamber and the variable pressure chamber is below the predetermined value and closes the communication passage when the pressure differential between the constant pressure chamber and the variable pressure chamber exceeds the predetermined value.

The hydraulic pressure brake device can also be constructed to include a power piston integrally formed with the second transmitting element and a communication passage formed in the power piston. A detecting mechanism includes a brake pedal operation sensor for sensing the amount of the pedal operation which is compared with a predetermined value. The operation of the pump stops when the detected amount of the pedal stroke is lower than the predetermined value and drives the pump when the detected amount of the pedal stroke exceeds the predetermined value.

The brake pedal operation sensor, which can be a stroke sensor that detects the brake pedal stroke, a brake pedal depression sensor that detects the depression force of the brake pedal, and a pressure sensor that detects the output hydraulic pressure of the master cylinder, can be used to judge the initiation of the driving of the pump based on the detected output of the stroke, the depression force, and the master cylinder hydraulic pressure, either individually or in combination.

The judgment value for initiating the pump driving operation is set immediately before the limit of the boosting force of the vacuum boosting device is reached to assure the smooth movement at the time of adding the hydraulic pressure boosting force of the hydraulic pressure boosting device.

The hydraulic pressure brake device can also be provided with a pressure sensor detecting the pressure in the variable pressure chamber of the vacuum boosting device, with the detected pressure value being compared with a predetermined value to stop the driving of the pump when the detected pressure value is below the predetermined value and driving the pump when the detected pressure value exceeds the predetermined value.

The judgment regarding initiation of the pump driving is made by the detected output of the pressure value or the differential value. The judgment value for initiating the pump driving is set immediately before the limit of boosting force of the vacuum boosting device in order to assure the smooth movement at the time of adding the hydraulic pressure boosting force of the hydraulic pressure boosting device.

According to another aspect of the invention, a hydraulic pressure brake device includes a master brake cylinder having a master cylinder piston and a pressure chamber for outputting hydraulic brake pressure in response to brake pedal operation, a vacuum boosting device which performs a vacuum boosting operation up to a boosting limit to boost operation of the master cylinder piston in response to the brake pedal operation, a pump for outputting hydraulic brake pressure independently of the master brake cylinder, a hydraulic boosting device which performs hydraulic boosting operation to boost the operation of the master cylinder piston by the hydraulic pressure output from the pump, a detecting mechanism for detecting a condition of at least one of the vacuum boosting device and the brake pedal, and a valve prohibiting the hydraulic boosting operation by the hydraulic boosting device during the vacuum boosting when the vacuum boosting is less than the boosting limit of the vacuum boosting device and for allowing the hydraulic boosting operation by the hydraulic boosting device when the vacuum boosting by the vacuum boosting device exceeds the boosting limit of the vacuum boosting device. The pump is adapted to be driven based on the condition detected by the detection mechanism.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE PREFERRED EMBODIMENTS

Referring initially to FIGS. 1–4, the hydraulic pressure brake device according to an embodiment of the present invention includes a brake master cylinder MC, vacuum brake booster VB, and a hydraulic brake booster HB.

Figure 1:
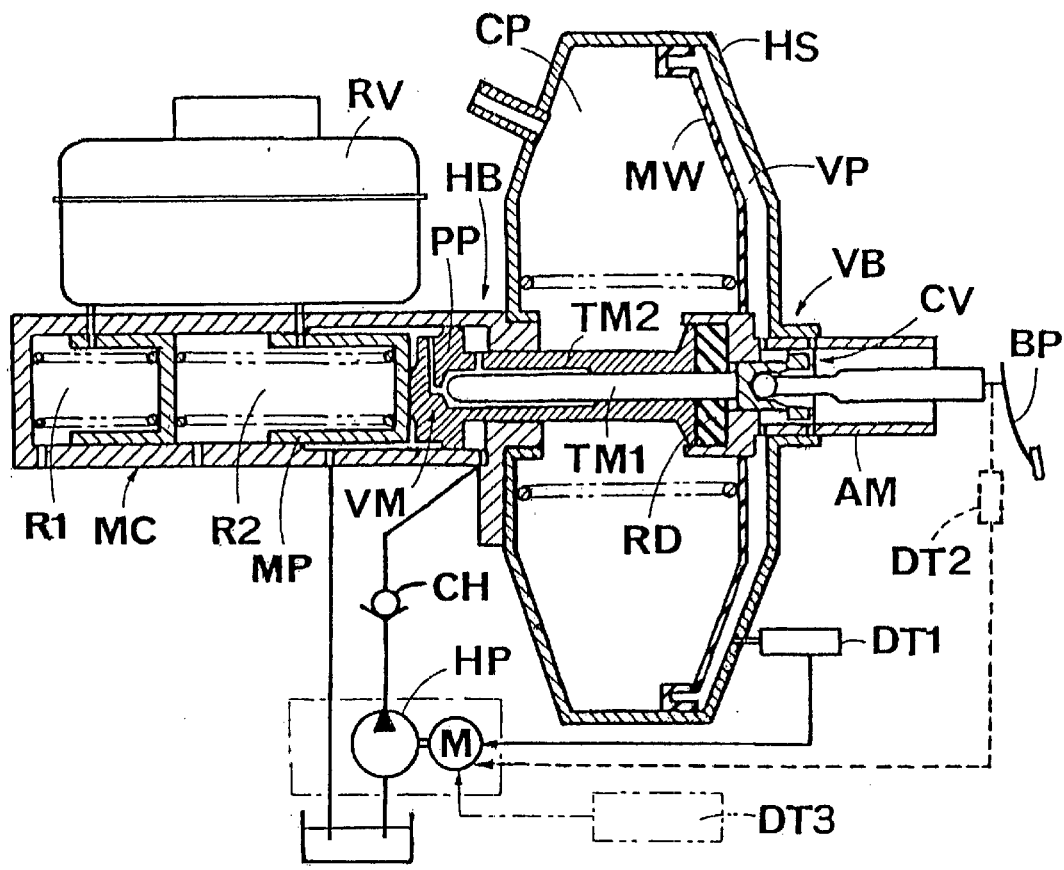
FIG. 1 is a cross-sectional view of a first embodiment of a hydraulic pressure brake device according to the present invention.

When the master cylinder piston MP associated with the master cylinder MC is moved to the left as viewed in FIG. 1 in response to the depression of a brake pedal BP, the brake fluid from a reservoir RV is pressurized to be transmitted to wheel cylinders (not shown) through pressure chambers R1, R2.

The vacuum brake booster VB and the hydraulic brake booster HB function to boost the operation of the master cylinder piston in response to the operation of the brake pedal BP, and these brake boosters constitute the vacuum boosting device and the hydraulic pressure boosting device of this invention.

The pressurized brake fluid from the master cylinder MC is supplied to respective wheel brake cylinders operatively associated with the respective vehicle wheels (not shown) for effecting the braking operation.

The vacuum booster VB includes a housing HS, a movable wall MW, a constant pressure chamber CP, a variable pressure chamber VP and a driving element AM supported by the housing HS. The constant pressure chamber CP and the variable pressure chamber VP are defined in the housing HS and are separated or divided by the movable wall MW.

The constant pressure chamber CP is connected to an intake manifold of the vehicle for supplying vacuum to the constant pressure chamber CP and the variable pressure chamber VP is exposed to atmospheric pressure through the driving element AM which is movable with the movable wall MW and is movably supported on the housing HS.

The vacuum booster VB further includes a control valve mechanism CV which controls the communication between the variable pressure chamber VP and the atmosphere and between the constant pressure chamber CP and the variable pressure chamber VP in response to the brake pedal BP operation. A pressure differential is generated between the two chambers CP, VP by the operation of the control valve mechanism CV. As a result of this pressure differential, the vacuum booster VB generates a boosting force to move the master cylinder piston MP.

A power piston PP is disposed at the rear end (i.e., the right end in FIG. 1) of the master cylinder piston MP. The power piston PP is formed with a communication passage which hydraulically connects hydraulic chambers provided at the front and rear side of the power piston PP. A valve mechanism or valve means VM is provided in the power piston PP to open the communication passage until the vacuum booster VB is operated to its boosting limit and closes when the vacuum booster exceeds its boosting limit by a first force transmitting element TM1.

Described in more detail, the first force transmitting element TM1 is disposed between the brake pedal BP and the master cylinder piston MP through the valve means VM. A second force transmitting element TM2 is provided between the driving element or driving means AM and the master cylinder piston MP and enclosing the first force transmitting element TM1. The power piston PP and the second force transmitting element TM2 are formed integrally in this embodiment.

The valve mechanism VM is controlled in response to the relative movement of the first and second force transmitting elements TM1, TM2. When the pressure differential between the constant and variable pressure chambers CP, VP is below a predetermined value, the valve mechanism VM is positioned at a first position and when the pressure differential between the constant and variable pressure chambers CP, VP of the vacuum booster VB exceeds the predetermined value, the valve mechanism VM is positioned at a second position. When the valve mechanism VM is positioned at the second position, the brake pedal BP and the master cylinder piston MP are in a force transmittal engagement position through the valve mechanism VM and the first force transmitting element TM1.

An elastic member RD serving as a reaction force damper is disposed between the second force transmitting element TM2 and the driving mechanism AM. The first force transmitting element TM1 is directly connected to the brake pedal, through the connecting rod, so as to bypass the elastic member RD. That is, the first force transmitting element passes through a hole in the elastic member RD and is connected to the connecting rod of the brake pedal BP, without being influenced by the reaction force of the elastic member RD.

A hydraulically operated pump HP is driven by an electric motor M for generating a brake pressure independently of the master cylinder MC. The input side of the hydraulic pump HP is connected to the reservoir RV and the out put side of the hydraulic pump HP is connected to the hydraulic chamber or power chamber provided at the rear side of the power piston PP through a check valve CH.

When the output pressure (power pressure) of the hydraulic pump HP is supplied to the power chamber, the power piston PP is driven to boost the movement of the master cylinder piston MP for assisting the brake operation.

Further, a pressure sensor DT1 serving as a first detecting mechanism or first detecting means detects the pressure level of the variable pressure chamber VP. This pressure sensor DT1 may be substituted for a stroke sensor DT2 illustrated by a dotted line in FIG. 1 which serves as a second detecting mechanism or second detecting means for detecting the amount of operation of the brake pedal BP or the amount of stroke of the brake pedal BP.

When either one of the pressure sensor and the stroke sensor detects an output exceeding a predetermined value, the electric motor M is driven to supply brake pressure from the hydraulic pressure pump HP to the power chamber provided at the rear side of the power piston PP.

When the vacuum booster VB reaches its maximum operation (i.e., the limit of the boosting force), with the driving element AM correspondingly also reaching its maximum operation, the second force transmitting element TM2 is positioned at its predetermined position. The second force transmitting element TM2 moves in response to the brake pedal BP operation to actuate the valve means VM to close the communication passage of the power piston PP. This causes the power chamber at the rear side of the power piston PP to be closed. The movement of the master cylinder piston MP is boosted by the output pressure from the hydraulic pump HP.

Considering the way in which the driving of the hydraulic pump HP is initiated, the detected pressure Pv in the variable pressure chamber VP by the pressure sensor DT1 is compared with a predetermined pressure value Kp and when the detected pressure Pv becomes larger than the predetermined pressure Kp, the electric motor M is driven to output the brake pressure from the hydraulic pump HP. Thus, as long as the pressure Pv in the variable pressure chamber VP is below the predetermined value Kp, the electric motor M is not driven and so the hydraulic pump is in the rest position or non-operational condition.

The predetermined pressure value Kp is determined based on the boosting limit of the vacuum booster VB, and to assure a smooth transfer to the addition of the boosting force by the hydraulic pump HP, the vacuum value Pv is preferably set to the value immediately before the pressure in the variable pressure chamber VP becomes or reaches atmospheric pressure (i.e., immediately before the vacuum booster reaches its boosting limit).

Alternatively, it may be possible to differentiate the value of the pressure Pv in the variable pressure chamber VP to obtain the differential amount DPv of Pv, and then compare the amount DPv with a predetermined value Kdp. The predetermined value Kdp is also preferably set to the differential amount of the pressure immediately before the vacuum booster VB reaches its boosting limit.

As a condition of the judgment concerning initiation of the operation of the hydraulic pump HP, by combining the compared results of the pressure Pv and the predetermined pressure Kp and when both conditions are met, the electric motor M is driven.

In addition to the above conditions, a conventional brake switch for detecting the operation of the brake pedal BP may be used to judge the driving initiation of the motor M. In other words, when the brake switch is ON and when the pressure Pv and/or the differential amount DPv exceeds the respective predetermined values Kp and/or Kdp, the electric motor M is driven.

As a mechanism or means for detecting the operational amount of the brake pedal BBP, the stroke sensor DT2 shown in dotted line in FIG. 1 can be used. Based on a comparison of the detected stroke (St) of the brake pedal BP with a predetermined stroke value KSt, when the detected stroke value St becomes greater than the predetermined value KSt, the motor M is driven. The predetermined stroke value KSt is determined based on the boosting limit of the vacuum booster VB. To assure the smooth transfer to the addition of the boosting force by the hydraulic pump HP, the stroke value KSt is preferably set to the value immediately before the vacuum booster reaches its boosting limit.

As an alternative, it may be possible to differentiate the value of the determined stroke St to obtain the differential amount DSt of St, and to then compare that amount with a predetermined value Kds. The predetermined value Kds is also preferably set to the differential amount of the stroke immediately before the vacuum booster VB becomes its boosting limit.

Another mechanism or means for detecting the operation amount of the brake pedal BP involves a depression force sensor for sensing the depression force of the brake pedal BP. Further, there may be provided a pressure detecting means for detecting the output brake pressure from the master cylinder MC. By using the detected depression force or the master cylinder pressure and/or their differentiated values, an appropriate judgement can be made regarding initiating the driving operation of the electric pump M.

Further, a vehicle speed sensor DT3 shown with a two dotted chain line in FIG. 1 may be used to drive the electric motor M (and accordingly the hydraulic pump) in response to the vehicle speed.

Figure 2:
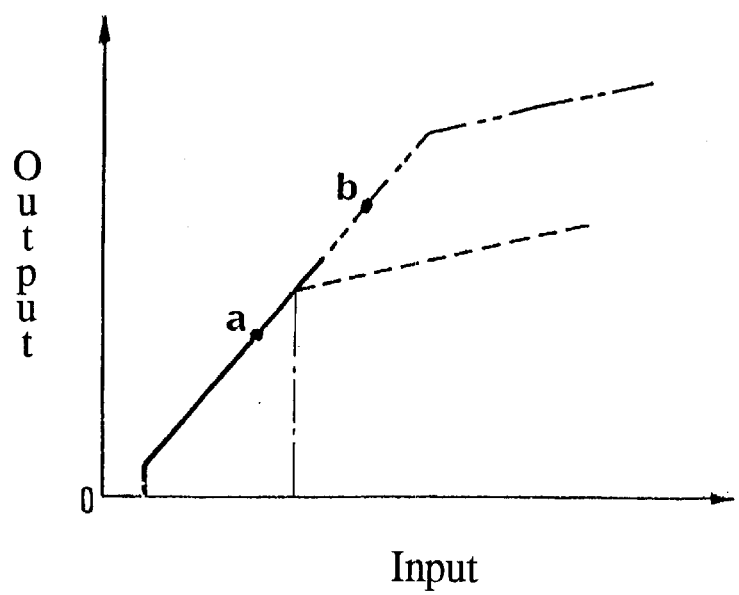
FIG. 2 is a graph showing the input and output characteristics of the hydraulic pressure brake device shown in FIG. 1.

The hydraulic pressure brake device according to this embodiment of the present invention is able to exhibit the performance characteristics shown in FIG. 2. The graph shown in FIG. 2 shows the relationship between the input (i.e., the depression force of the brake pedal BP) and the output (hydraulic brake pressure from the master cylinder MC). The bold line in the graph shows the boosting operation of the vacuum booster VB, the dotted line shows the boosting limit condition of the vacuum booster VB, and the two dotted chain line shows the boosting operation of the hydraulic booster HB in addition to the boosting operation of the vacuum booster VB.

Figure 3:
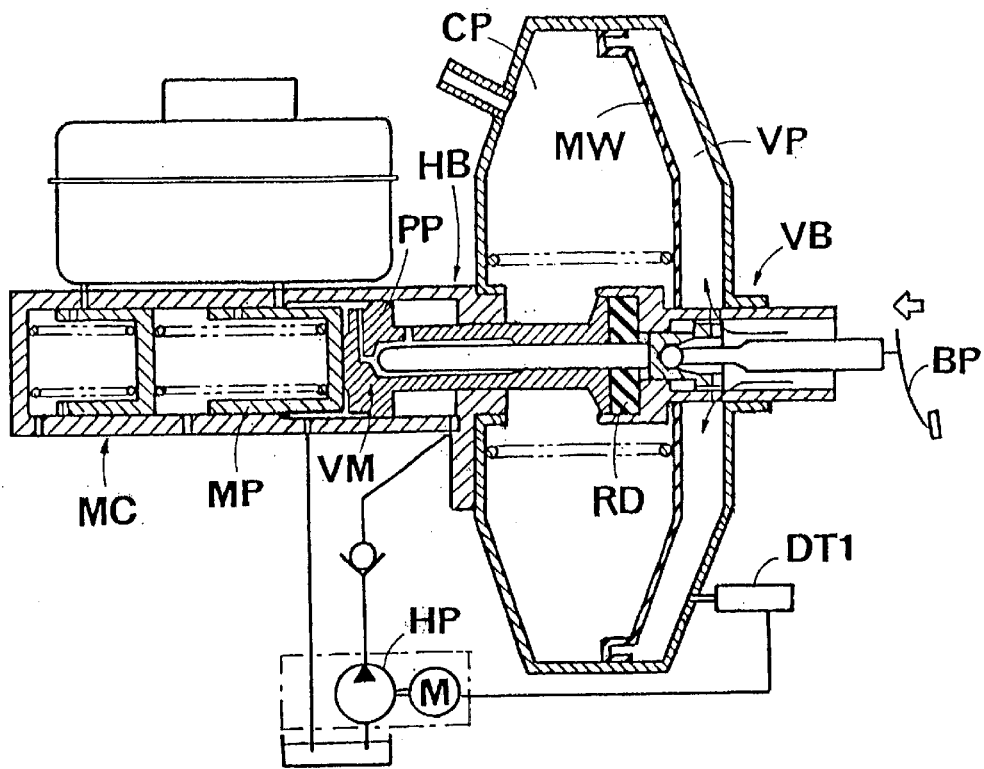
FIG. 3 is a cross-sectional view of the hydraulic pressure brake device shown in FIG. 1 illustrating an operational condition of a vacuum boosting device.

When the brake pedal BP is operated, the brake device in the non-operated position shown in FIG. 1 is changed to the position shown in FIG. 3. Atmospheric pressure is introduced into the variable pressure chamber VP as shown by the arrows and the vacuum booster VB initiates the boosting operation. Such boosting operation performance is shown at the point a in FIG. 2.

With further depression of the brake pedal BP, the pressure Pv in the variable pressure chamber VP is increased and when the pressure Pv detected by the pressure sensor DT1 becomes higher than a predetermined value Kp, the electric motor M is driven to operate the hydraulic pump HP. The hydraulic pump supplies brake pressure to the power chamber provided at the rear side of the power piston PP.

Figure 4:
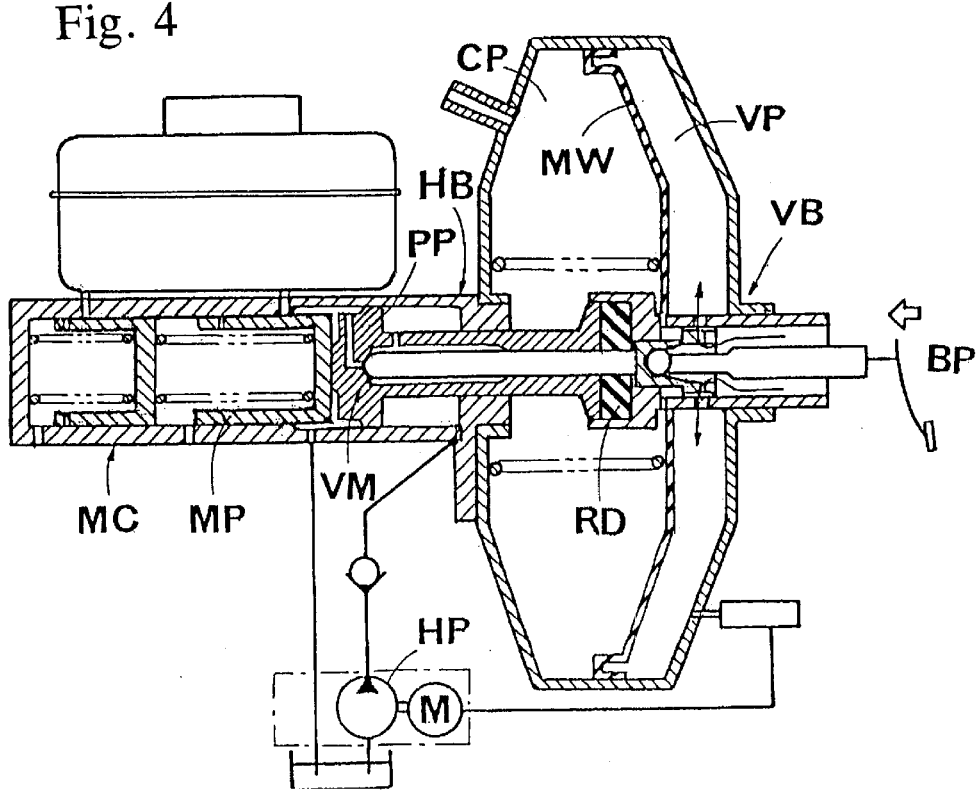
FIG. 4 is a cross-sectional view of the hydraulic pressure brake device shown in FIG. 1 illustrating an operational condition of a vacuum boosting device and a hydraulic pressure boosting device.

Accordingly, the pressure in the variable pressure chamber VP of the vacuum booster VB reaches the atmospheric pressure level as shown in FIG. 4. With the pressure differential between the constant pressure chamber CP and the variable pressure chamber VP being at a maximum, the valve means VM is actuated so that the communication passage is closed by the first force transmitting element TM1 as shown in FIG. 4. The power piston PP is then moved forward (i.e., to the left) by the pressure from the hydraulic pump HP. Thus the hydraulic boosting provided by the hydraulic booster HB is added to the vacuum boosting provided by the vacuum booster VB. This condition is illustrated at point b in FIG. 2.

According to this embodiment of the present invention, when the pressure sensor DT1 detects that the pressure Pv in the variable pressure chamber VP is higher than the predetermined value Kp, the electric motor M is driven at a proper timing immediately before the vacuum booster VB reaches its boosting limit to begin supplying hydraulic pressure from the hydraulic pump to the power chamber provided at the rear side of the power piston PP. After the vacuum booster VB reaches its boosting limit, the valve mechanism VM is actuated to close the communication passage through movement of the first force transmitting element TM1 to thereby immediately initiate boosting operation by the hydraulic booster HB.

Thus the operation frequency of the hydraulic pump HP and the electric motor M is controlled to a minimum. The hydraulic pump HP is driven before the vacuum booster VB reaches its boosting limit and so the boosting transfer from the vacuum booster alone to the boosting provided by both the vacuum booster and the hydraulic booster can be achieved in a rather smooth fashion and with good responsiveness. Responsiveness is also assured even under emergency braking operation.

By monitoring the detected outputs from the pressure sensor and other sensors, it is possible to detect an insufficient vacuum level of the vacuum source which is connected to the constant pressure chamber CP of the vacuum booster VB. If a shortage of the vacuum level arises, the necessary braking force is guaranteed by the boosting of the hydraulic booster HB and it is effective to assure the so-called partial braking force.

Further, without employing complicated devices and by utilizing a relatively simple construction such as the valve mechanism, it is possible to perform additional boosting in a rather smooth manner by the hydraulic booster HB after the boosting limit of the vacuum booster VB is reached.

Further, because the hydraulic pump HP is connected to the power chamber positioned at the rear side of the power piston PP through the check valve CH, even when the hydraulic pump HP ceases operation, brake pressure does not flow into the hydraulic pump HP from the power chamber, and a smooth boosting operation can be achieved.

Figure 5:
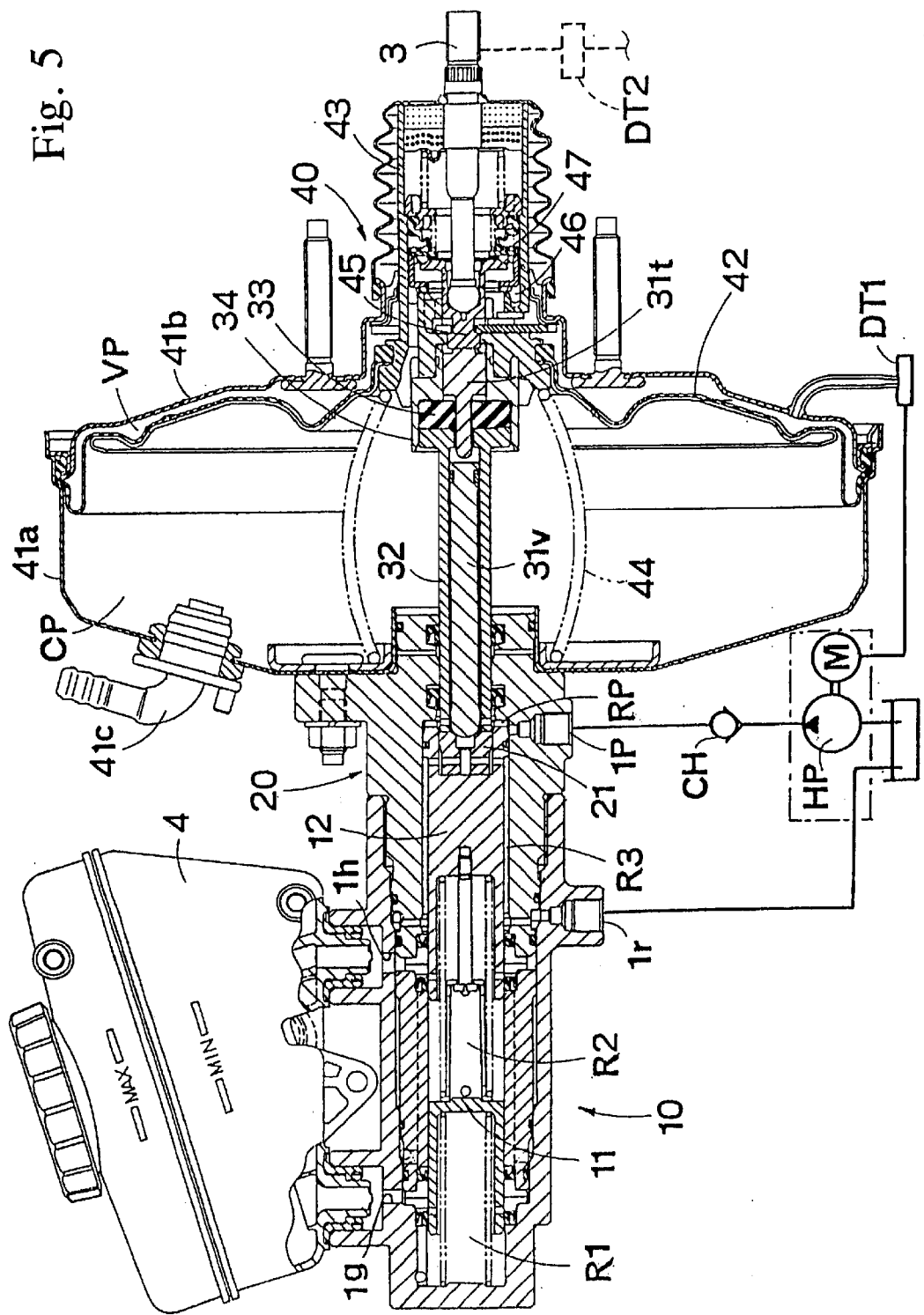
FIG. 5 is a cross-sectional view of a second embodiment of a hydraulic pressure brake device according to the present invention.
Figure 6:
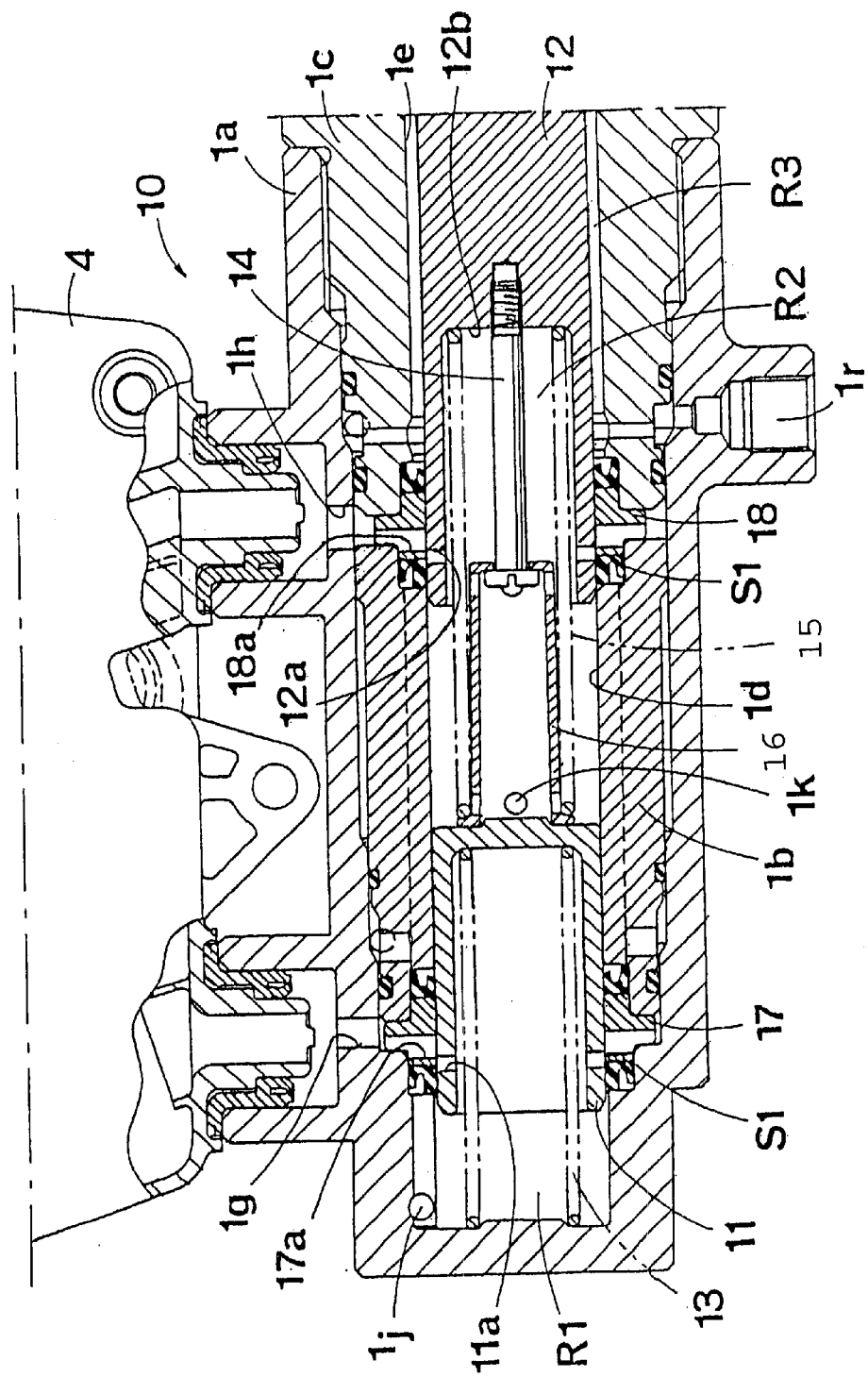
FIG. 6 is an enlarged cross-sectional view of a master cylinder used in the hydraulic pressure brake device shown in FIG. 5.
Figure 7:
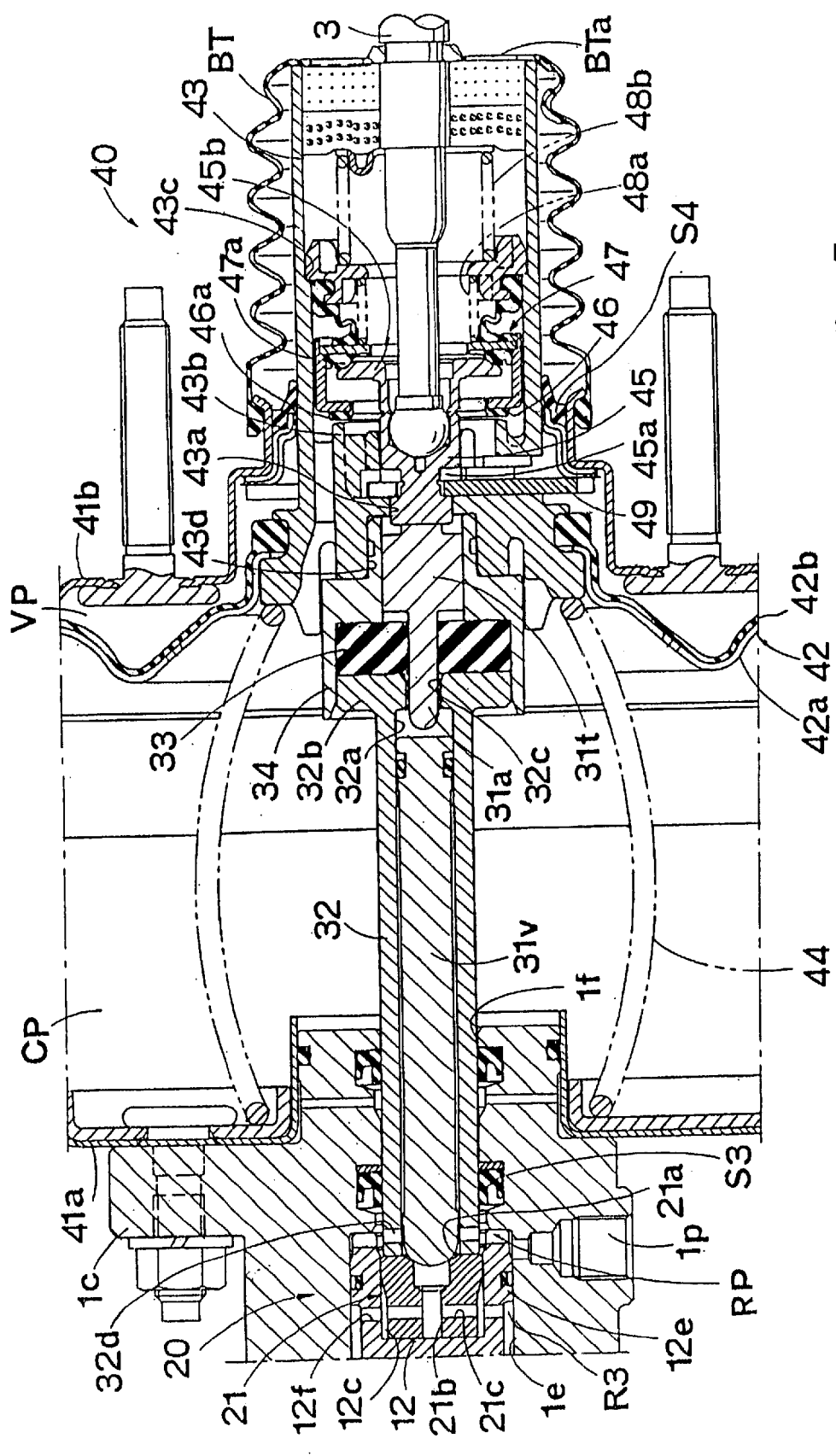
FIG. 7 is an enlarged cross-sectional view of a hydraulic pressure boosting device and a vacuum boosting device of the second embodiment of the present invention.

FIGS. 5–7 illustrate another embodiment of the present invention, with FIG. 5 illustrating the hydraulic pressure brake device, FIG. 6 illustrating an enlarged view of the master cylinder, and FIG. 7 illustrating an enlarged view of the hydraulic booster and the vacuum booster. The main difference between the previous embodiment and this embodiment relates to the structure of the hydraulic boosting portion. That is, the constructions of the vacuum boosting portion and the master cylinder portion are generally the same as in the earlier embodiment, but the constructions of the hydraulic booster, and the first and second force transmitting elements differ from the previous embodiment.

As shown in FIG. 5, a master cylinder 10 and a hydraulic booster 20 are provided at the vehicle front side (i.e., left side as viewed in FIG. 5) and a vacuum booster 40 is provided at the rear side of the master cylinder and the hydraulic booster. Positioned further rearwardly is a brake pedal BP (not shown in FIG. 5). The depression force from the brake pedal BP is transmitted to an input rod 3 as a brake operation force. In response to the depression force of the brake pedal BP, the vacuum booster 40 boosts the brake operation force and the hydraulic booster 20 further boosts the brake operation force when the vacuum booster 40 reaches its boosting limit. Thus added boosting force is transmitted to the master cylinder 10 to output the brake pressure to each wheel brake cylinder installed at each vehicle wheel.

As shown in FIG. 6, the master cylinder 10 includes a first cylinder 1a, a second cylinder 1b and a third cylinder 1c, with both the second and third cylinders 1b, 1c being positioned in the first cylinder 1a in series. A first piston 11 is slidably disposed in the second cylinder 1b while a second piston is slidably disposed in the third cylinder 1c.

One end of the first cylinder 1a is closed and the inner diameter of the first cylinder increases in step-wise manner toward the open end of the first cylinder 1a. The second cylinder 1b possesses an approximately cylindrical shape in which is formed a cylinder bore 1d.

The third cylinder 1c possesses a flange portion, as well as a cylinder bore 1e and a communication bore 1f shown in FIG. 7. The inner diameter of the cylinder bore 1e is larger than the inner diameter of the bore 1d of the second cylinder 1b. The communication bore 1f is formed at the rear end of the cylinder 1c and is in communication with the cylinder bore 1e. Also, the diameter of the communication bore If is smaller than the inner diameter of the cylinder bore 1d.

The first cylinder 1a is provided with several supply ports 1g, 1h, several outlet ports 1j, 1k, and a discharge port 1r. In addition, the third cylinder 1c is provided with an inlet port 1p as shown in FIG. 7.

The second cylinder 1b is inserted into the first cylinder 1a, with an annular element 17 located at the forward end of the second cylinder 1b. The annular element 17 has a communication hole 17a extending in the radial direction and U-shaped sealing elements S1 provided at both ends of the annular element 17.

The third cylinder 1c is inserted into the first cylinder 1a, with an annular element 18 being located at the forward end of the third cylinder 1c. The annular element 18 has a communication hole 18a extending in the radial direction and U-shaped sealing elements Si provided at both ends of the annular element 18.

The first piston 11 is shdably and fluid tightly disposed in the cylinder bore 1d to define a pressure chamber R1 between the closed end of the first cylinder 1a and the closed end of the first piston 11. Under the non-operating condition, the first piston 11 faces the communication hole 17a of the annular element 17, with a communication hole 11a being provided in a skirt portion of the piston 11 for allowing fluid communication between the pressure chamber R1 and a reservoir 4 through the supply port 1g.

The second piston 12 is formed with a recessed portions 12b at the forward facing axial end as shown in FIG. 6 as well as a recessed portion 12c at the rearwardly facing opposite end as shown in FIG. 7.

The rear end of the second piston 12 is enlarged to define a larger diameter portion 12e as illustrated in FIG. 7. The front end of the second piston 12 is slidably positioned in a fluid tight manner in the cylinder bore 1d as shown in FIG. 6 to define a pressure chamber R2 between the first and second pistons 11, 12.

Under the non-operating condition, the second piston 12 faces the communication hole 18a of the annular element 18, with a communication hole 12a being provided in a skirt portion of the piston 12 for allowing fluid communication between the pressure chamber R2 and the reservoir 4 through the supply port 1h.

A valve seat element 21 is disposed in the recessed portion 12c at the rear end of the second piston 12. The valve seat element 21 is engageable with a tip end of a valve element 31v. The function and operation associated with this valve will be described below in more detail.

A power chamber RP is defined within the cylinder bore 1e of the third cylinder 1c. The power chamber RP is located between the rear end face of the larger diameter portion 12e and the bottom face of the recessed portion of the third cylinder ic and is adapted to communicate with the inlet port 1p.

A hydraulic chamber R3 is provided between the outer peripheral surface of the second piston 12 at the front side of the larger diameter portion 12e and the inner peripheral surface of the cylinder bore 1e, with normally open communication being provided between the hydraulic chamber R3 and the discharge port 1r.

A radially extending communication hole 12f is provided at the front side of the larger diameter portion 12e of the second piston 12 for permitting communication between the recessed portion 12c and the hydraulic chamber R3.

A spring 13 is disposed between the bottom of the recessed portion of the first cylinder 1a and the bottom of the recessed portion of the first piston 11 to always bias the first piston 11 in the rightward direction (i.e., toward the second piston 12 as viewed in FIG. 6. Also, another spring 15 is disposed between the front face of the recessed portion 12b of the second piston 12 and the bottom of the retainer 16 to always bias the first and second pistons 11, 12 in opposite directions.

One end of a rod 14 is secured to the bottom of the recessed portion 12b of the second piston 12 and the other end (i.e., the head portion) of the rod 14 is engaged with a spring retainer 16. The other end of the retainer 16 is in contact with the rear side of the bottom wall of the first piston 11.

As shown in FIG. 7, the hydraulic booster 20 is formed at the rear end of the second piston 12. The master cylinder piston is formed by the first and second pistons 11 and 12 and the larger diameter portion 12c of the second piston 12 functions as a power piston of the hydraulic booster 20.

It may be possible to provide a power piston separately from the master cylinder piston, i.e., the larger diameter portion 12e of the second piston 12 may be separately formed from the second piston 12.

A valve element 21 is disposed in a recessed portion 12c of the larger diameter portion 12e and includes a valve seat 21a at one end, an axial passage 21b, and a radial passage 21c. Both of the passages 21a, 21b are in communication with the valve seat 21a. When the valve element 31v is separated from the vale seat 21a, the hydraulic chamber R3 is in communication with a power chamber RP through the passages 21b, 21c of the valve element 21.

A second force transmitting element 32 is slidably disposed in a fluid-tight manner in the communication bore 1f of the third cylinder 1c. The valve element 31v is slidably disposed in a fluid-tight manner in the inner space 32a of the second force transmitting element 32.

The inner surface of the communication bore 1f is provided with two annular grooves that are spaced apart in the axial direction from one another. The annular grooves each receive a U-shaped sealing element S3 for sealing the power chamber RP.

The vacuum booster 40 is formed with a housing 41a and a housing 41b to form a shell type housing. A movable wall 42 is disposed in the housing and the outer peripheral portion of the movable wall 42 is securely between the housings 41a, 41b. The movable wall 42 thus separates the interior of the housing into a constant pressure chamber or vacuum chamber CP and a variable pressure chamber VP. The constant pressure chamber CP is to be connected to a vacuum source such as an intake manifold of the vehicle via an inlet port 41c for supplying vacuum to maintain the chamber CP under vacuum.

The movable wall 42 is formed by a pressure receiving plate 42a and a diaphragm 42b. One open end of a cylindrical driving mechanism or means 43 (i.e., a vacuum booster power piston) is secured in an air-tight manner to the central portion of the movable wall 42 and the other open end of the driving mechanism 43 penetrates the housing 41b and extends rearward (i.e., in the rightward direction as viewed in FIG. 7). The driving mechanism 43 is slidably supported in an air-tight manner by the opening of the housing 41b through a sealing element S4 and is enclosed by a boot BT. The boot BT is secured to the input rod 3 and includes an opening end BTa exposed to atmospheric pressure.

A spring 44 is provided between the front end of the driving mechanism and the inner wall of the front side housing 41a for biasing the movable wall 42 in the rearward direction (i.e., towards the right as viewed in FIG. 7).

The input rod 3 is positioned on the central axial line of the driving mechanism 43 and at its forward end is connected to a plunger 45 through a ball joint mechanism. The plunger 45 is slidably supported in a communication hole 43a axially formed in the driving mechanism 43. A valve seat 43b is formed around the communication bore 43a. A first control valve mechanism 46 is provided in the driving mechanism 43 enclosing the valve seat 43b and includes an annular valve element 46a adapted to be biased to engage the valve seat 43b. This first control valve mechanism 46 constitutes a control valve.

A second control valve mechanism 47 is provided at the rear end of the plunger 45 and includes a valve seat 45b formed on the rear end of the plunger 45 and an annular valve element 47a biased for engagement with the valve seat 45b. This second control valve mechanism 47 constitutes an air valve having the valve element 47a at the front end of a cylindrical elastic element and a spring 48a disposed at the rear end of the cylindrical elastic element for biasing the air valve toward the valve seat 43b. The second control valve mechanism 47 also includes the cylindrical elastic element which is biased toward the valve seat 43b by a spring 48b to engage the valve mechanism 47 with an inner stepped portion 43c provided in the driving mechanism 43.

An annular smaller diameter portion 45a is provided at the rear portion of the slidable portion located at a forward or front end of the plunger 45 and a key member 49 is disposed in this smaller diameter portion 45a. The key member 49 is slidable in the axial direction over a predetermined distance relative to the smaller diameter portion 45a. The key member 49 extends outwardly from the outer periphery of the driving means 43 and engages the housing 41b to control the axial movement of the plunger 45. This restricted axial movement of the plunger 45 defmes the return position of the movable wall 42.

A recessed portion 43d is provided at the front portion of the driving mechanism 43 and a plug member 34 is disposed in this recessed portion 43d. The plug member 34 supports a reaction rubber disc 33 and the rear end 32b of the second force transmitting element 32. An intermediate element 31t forms a first force transmitting element together with the valve element 31v and includes a projection 31a at the top end of the intermediate element 31t. This projection 31a passes through the rubber disc 33 and extends in the forward direction. The reaction rubber disc 33 is substantially the same in function as the reaction elastic element RD used in the first version of the invention described above.

The tip end or forward end of the projection 31a is in contact with the rear end of the valve element 31v and the rear end of the projection 31 is in contact with the tip end or froward end of the plunger 45. The intermediate element 31t is movable in the axial direction along a predetermined distance.

The first force transmitting element of this embodiment is constituted by two parts, the intermediate element 31t and the valve element 31v, which differs from the single component employed in the first embodiment.

The second force transmitting element 32 includes an interiorly located hollow portion 32a and an exteriorly located flange portion 32b at the rearward end which is received in the plug member 34. The flange portion 32b is formed with an axial communication hole 32c in communication with the hollow portion 32a.

The intermediate element 31t extends inwardly into the hollow portion 32a of the second force transmitting element 32 via the communication hole 32c so that the projection 31a is able to contact the valve element 31v. A radial communication hole 32d is formed at the front end portion of the second force transmitting element 32 and the front part of the hollow portion 32a is thus capable of communicating with the power chamber RP. Accordingly, when the vacuum booster 40 is in boosting operation, the pressure in the variable pressure chamber VP increases to move the movable wall 42. When such pressure reaches a predetermined value, the reaction rubber disc 33 is expanded rearwardly at a portion opposing the intermediate element 31t to contact the top end surface of the intermediate element 31t and add a reaction force in the rearward direction to the plunger 45 and the intermediate element 31t proportional to the pushing force of the movable wall 42.

The first and second control valve mechanisms 46, 47 are controlled in response to the differential force between the reaction force and the operation force applied to the input rod 3.

When the hydraulic booster is in boosting operation, a power pressure is generated which is defmed by the cross-sectional area of the valve element 31v disposed in the second force transmitting element 32 and is transmitted to the input rod 33 as a reaction force.

As shown in FIG. 5, similar to the previous embodiment, a hydraulic pressure pump HP is provided and is driven by the electric motor M. The inlet side of the hydraulic pump HP is hydraulically connected to the reservoir 4 and the outlet side is connected to the power chamber RP through the check valve CH.

As the outlet pressure from the hydraulic pump HP is supplied to the power chamber RP, when the vacuum booster 40 reaches its boosting limit to engage the valve element 31v with the valve seat 21, the second piston 12 is further boosted by the pressure from the hydraulic pump HP. The pressure sensor DT1 detects the pressure in the variable pressure chamber VP and the judgment for initiating operation of the hydraulic pump driving is made in response to the detected pressure by the sensor DT1.

As in the case of the embodiment described above, other sensors such as a brake pedal operation sensor, a brake pedal stroke sensor, etc. can also be employed, either individually or in combination for judging the driving timing of the hydraulic pump HP.

The operation of the hydraulic pressure brake device is as follows. First, when the brake pedal is not operated, the components of the brake device are positioned in the manner shown in FIGS. 5–7. The vacuum booster 40 is under the non-operational condition, the second control valve mechanism 47 is closed bv the contact between the valve element 47a and the valve seat 45b, and the variable pressure chamber VP is prevented from communicating with the atmospheric pressure. The first control valve mechanism 46 is in communication with only the vacuum in the constant pressure chamber CP.

When the brake pedal is depressed to push the input rod 3, the valve element 47a is separated from the valve seat 45b due to the leftward movement of the rod 3. When the total force VP produced by the operation force of the rod 3 and the force caused by the pressure differential between the constant pressure chamber CP and the variable pressure chamber exceeds the biasing force of the spring 48b, the input rod 3 and the plunger 45 are moved leftward (i.e., in the forward direction) to engage the valve seat 43b of the driving means 43 with the valve element 46a of the first control valve mechanism 46 to interrupt fluid communication between the constant and variable pressure chambers CP, VP.

Then the valve element 47a of the second control valve mechanism 47 is separated from the valve seat 45b to introduce atmospheric pressure into the variable pressure chamber VP through the boot BTa. The pressure in the variable pressure chamber VP is accordingly increased to move the movable wall 42 forward to thereby move the second piston 12 forward through the plug member 34, the reaction rubber disc 33, the second force transmitting element 32 and the valve element 21. Due to the movement of the second piston 12, the first piston 11 is also moved forward.

As the brake pedal BP is further depressed and when the pressure sensor DT1 detects the boosting limit of the vacuum booster 40, the electric motor M is driven to drive the hydraulic pump HP. That is, when the pressure sensor DT1 detects that the pressure Pv in the variable pressure chamber VP being higher than the predetermined pressure value Kp, the electric motor M is driven immediately before the vacuum booster reaches the boosting limit, to thereby supply hydraulic pressure from the hydraulic pump HP with the power chamber RP through the inlet port 1p. Thus, when the vacuum booster 40 reaches its boosting limit, the boosting operation by the hydraulic booster 20 is initiated. In other words, when the valve element 31v is driven in response to the brake pedal operation and is seated with the valve seat 21, communication between the power chamber RP and the hydraulic chamber R3 is interrupted. The output pressure from the hydraulic pump HP, i.e., the power pressure, is applied to the rear end surface of the larger diameter portion 12e to move the power piston 12 forward. The power pressure defmed by the effective cross-sectional area of the valve element 31v is applied to the input rod 3 as a reaction force.

Thus explained, the brake device according to this embodiment is able to minimize the operational frequency of the components such as the electric motor and the hydraulic pump HP. Also, the hydraulic pump HP is driven immediately before the vacuum booster 40 reaches its boosting limit and this leads to smooth and good responsiveness of the boosting operation by the hydraulic booster 20.

By monitoring the detected signals by the pressure sensor DT1, a shortage of the vacuum level of the vacuum source such as the intake manifold connected to the constant pressure chamber CP of the vacuum booster can be assessed to assure a so-called partial braking force.

Also, because the valve seat 21 is accommodated in the recessed portion 12c of the second piston 12, the valve means can be easily constructed.

Figure 8:
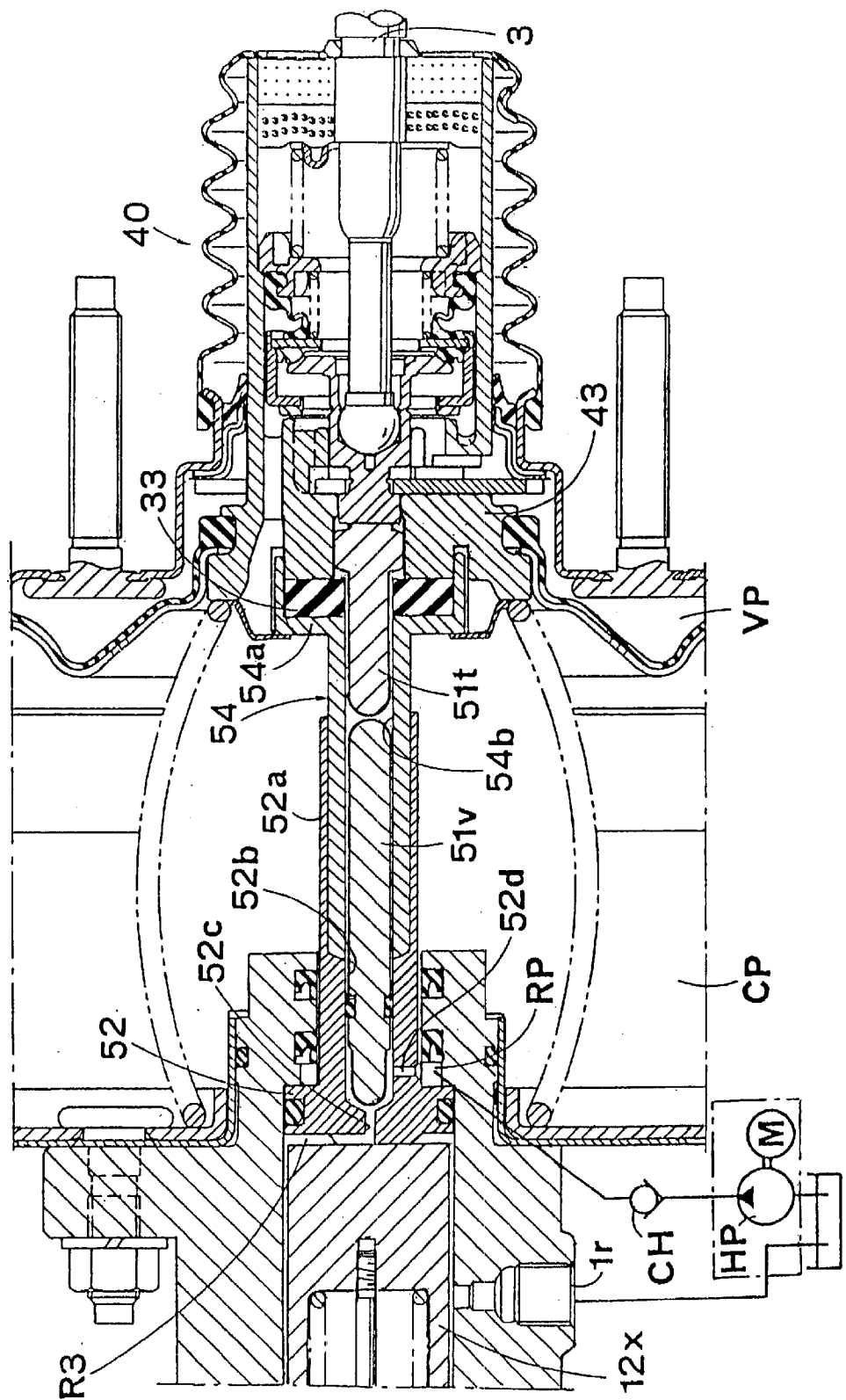
FIG. 8 is a cross-sectional view of a third embodiment of a hydraulic pressure brake device according to the present invention.

A further embodiment of the brake device according to the present invention is illustrated in FIG. 8. The valve element 51v and the intermediate element 51t forming the first force transmitting element are substantially the same as in those shown in FIG. 7. The second force transmitting element is formed by an extension 52a of the power piston 52 and a holding element 54 and the valve mechanism is formed in the power piston 52 in a manner similar to the power piston PP of the first embodiment. A detailed description of the parts in this version of the device which are similar to those in the above-described embodiments will not be repeated here.

In FIG. 8, the power piston 52 is provided at the rear side of the second piston 12x, and the hydraulic chamber R3 and the power chamber RP are defined by the power piston 52 at the front and rear sides respectively of the power piston 52. The second piston 12x here is different from the second piston 12 of FIG. 5 with respect to the provision of the recessed portion 12c.

The extension 52a is integrally formed with the power piston 52 on the rear side of the power piston 52. The valve element 51v is slidably disposed in a fluid-tight manner in the hollow portion 52b. In other words, the power piston 52 is integrally formed at the front end of the second force transmitting element. An axially extending communication hole 52c is formed on the power piston 52, and the rear open end of the hole 52c is formed with the valve seat for the valve element 51v.

Another communication hole 52d is provided on the piston 52 and extends in the radial direction. when the valve element 51v is separated from the valve seat at the communication hole 52c, the power chamber RP is in communication with the hydraulic chamber R3 through the communication hole 52d, the hollow portion 52b and the communication hole 52c. The hydraulic chamber R3 is connected to the reservoir through the discharge port 1r.

The second force transmitting element forms the holding element 54 having a flange 54a. A portion of the holding element 54 is enclosed by the extension 52a and is connected thereto. The valve element 51v and the intermediate element 51t are slidably disposed in a fluid-tight manner in the hollow portion 54b.

The flange 54a of the holding element 54 is secured to the driving mechanism 43 through the reaction rubber disc 33. The intermediate element 51t penetrates the reaction rubber disc 33 to extend in the forward direction, and the top end is in contact with the rear end surface of the valve element 51v.

In a manner similar to that described above, the hydraulic pump HP is provided and is driven by the electric motor M. The hydraulic pump HP is connected to the power chamber RP via a check valve CH. Upon hydraulic pressure from the hydraulic pump HP being supplied to the power chamber RP, when the vacuum booster 40 reaches its boosting limit to engage the valve element 51v with the valve seat formed at the communication hole 52c of the power piston 52, the second piston 12x is further boosted by the hydraulic pressure from the hydraulic pump HP.

A pressure sensor is also provided that is similar to the sensor DT1 shown in the embodiment shown in FIG. 5. This sensor detects the pressure Pv in the variable pressure chamber VP. Based on the signal from the pressure sensor DT1, operation of the hydraulic pump HP is initiated.

As a simple structure for the pressure sensor, a pressure switch may be used for on-off operation in response to a predetermined pressure value Kp.

When the pressure Pv in the variable pressure chamber VP becomes larger than the predetermined value Kp, the electric motor M is driven to drive the hydraulic pump HP to supply brake pressure with the power chamber. When the vacuum booster reaches its boosting limit, the valve element 51v is seated on the valve seat of the communication hole 52c in response to the depression of the brake pedal BP to interrupt communication between the power chamber RP and the hydraulic chamber R3. Then the output pressure from the hydraulic pump, i.e., the power pressure, is applied to the rear end surface of the power piston 52 to move the second piston 12x forward and the power pressure corresponding to the effective cross-sectional area of the valve element 51v is transmitted to the input rod 3 as a reaction force. Accordingly, the brake device of this embodiment is able to minimize the frequency of operation of the hydraulic pump HP and the electric motor M.

Further, because the hydraulic pump is driven immediately before the boosting limit of the vacuum booster 40 is reached, the boosting operation change can be achieved smoothly and with good responsiveness.

In accordance with the present invention, the hydraulic pressure brake device includes a vacuum boosting device and a hydraulic boosting device that includes a valve mechanism for prohibiting the boosting operation for the master cylinder piston by the hydraulic boosting device until the vacuum boosting device reaches its boosting limit and for permitting the boosting operation for the master cylinder piston by the hydraulic boosting device when the vacuum boosting device exceeds its boosting limit. The detecting mechanism detects at least either one of the operational conditions of the vacuum boosting device and the brake pedal operation condition, wherein based on the detected output by the detecting mechanism, a pump for supplying the boosting pressure by the hydraulic boosting device is controlled to be driven. Thus, the pump is properly driven immediately before the vacuum boosting device reaches its boosting limit to add the hydraulic boosting. This advantageously minimizes the frequency of operation of the pump and achieves the change of boosting operations in a relatively smooth manner and with a good responsiveness.

By providing first and second force transmitting element for controlling the valve mechanism in response to the relative movement of the first force transmitting element relative to the second force transmitting element, the boosting operation associated with the hydraulic boosting device can be smoothly added after the vacuum boosting device reaches its boosting limit without any complex control devices.

The valve mechanism opens and closes the communication passage provided in the master cylinder piston or opens and closes a communication passage in communication with a pair of hydraulic chambers formed at the front and rear side of the power piston disposed adjacent the master cylinder piston. With this construction, the boosting by the hydraulic boosting device in response to the boosting limit of the vacuum booster can be smoothly achieved with a relatively simple valve construction, thus negating the need for complex control devices.

Further, the power piston is integrally formed with the second force transmitting element to reduce the number of components and thereby further simplify the structure.

The detecting mechanism is a brake pedal operation sensor that detects the amount of brake pedal operation so that the hydraulic pump is operated by comparing the output signal from the brake pedal operation sensor with a predetermined operation value of the brake pedal. The boosting by the hydraulic boosting device can this be added relatively smoothly and with proper timing before the vacuum boosting device reaches its boosting limit and without the need for complex control devices. Also, the brake pedal operation condition can be detected independently of the vacuum booster operation condition to cope with emergency braking situations in a responsive manner.

The detecting mechanism can be a pressure sensor that detects the pressure amount of the variable pressure chamber of the vacuum booster to drive the hydraulic pump by comparing the output signal from the pressure sensor with a predetermined pressure value of the variable pressure chamber. Thus, the operation pressure of the vacuum boosting can be properly set based on the vacuum boosting limit and the hydraulic pump can be driven before the vacuum booster reaches its boosting limit. Thus the addition of the hydraulic boosting by the hydraulic booster can be smoothly achieved with proper timing.

The vacuum source condition supplied to the vacuum booster can be monitored to cope with any possible defects in the vacuum source such as in the intake manifold, and to also cope with the smooth change of the boosting by the hydraulic booster.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A hydraulic pressure brake having a vacuum boosting device and a hydraulic boosting device, comprising:
   a master brake cylinder that includes a master cylinder piston and a pressure chamber for outputting hydraulic brake pressure in response to a brake pedal operation;
   the vacuum boosting device for vacuum boosting operation of the master cylinder piston by vacuum pressure in response to the brake pedal operation;
   pump means for outputting a hydraulic brake pressure independently of the master brake cylinder;
   the hydraulic boosting device for hydraulic boosting operation of the master cylinder piston by the hydraulic pressure output from the pump means in response to the brake pedal operation;
   valve means for prohibiting the hydraulic boosting operation by the hydraulic boosting operation device during the vacuum boosting when the vacuum pressure is within a boosting limit of the vacuum boosting device and for allowing the hydraulic boosting operation by the hydraulic boosting device when the vacuum pressure by the vacuum boosting device reaches the boosting limit of the vacuum boosting device; and
   detecting means for detecting a condition of at least one of the vacuum boosting device and the brake pedal operation, with the pump means being driven based on an output signal from the detecting means.

2. The hydraulic pressure brake device according to claim 1, wherein the vacuum boosting device includes:
   a housing in which is positioned a movable wall dividing an interior of the housing into a constant pressure chamber adapted to be connected to a vacuum source and a variable pressure chamber adapted to be communicated with atmospheric pressure;
   control valve means movable with the movable wall and with respect to the housing for controlling the communication between the variable pressure chamber and the atmospheric pressure and for controlling communication between the variable pressure chamber and the constant pressure chamber in response to the brake pedal operation; and
   driving means for driving the master cylinder piston in response to a pressure differential between the constant pressure chamber and the variable pressure chamber; the hydraulic pressure brake device further comprising:
   a first force transmitting element disposed between the brake pedal and the master cylinder piston through the valve means; and
   a second force transmitting element transmitting the driving of the driving means to the master cylinder piston in response to the pressure differential between the constant and variable pressure chambers, the valve means being controlled in response to a position of the first force transmitting element relative to the second force transmitting element, the valve means being positioned at a first position prohibiting the hydraulic boosting operation when the pressure differential is within a predetermined value and being positioned at the second position when the pressure differential exceeds the predetermined value so that the brake pedal is engageable with the master cylinder piston via the valve means and the first force transmitting element.

3. The hydraulic pressure brake device according to claim 2, including elastic means disposed between the second force transmitting element and the driving means, the first force transmitting element being directly connected to the brake pedal and bypassing the elastic means.

4. The hydraulic pressure brake device according to claim 3, wherein the master cylinder piston includes a larger diameter portion at one end of the vacuum boosting device, a pair of hydraulic chambers provided at front and rear ends of the larger diameter portion to form the hydraulic boosting device and a communication passage in fluid communication with the pair of hydraulic chambers, and the valve means opening the communication passage when the pressure differential between the constant pressure chamber and the variable pressure chambers is within the predetermined value and closing the communication passage when the pressure differential exceeds the predetermined value.

5. The hydraulic pressure brake device according to claim 3, further comprising:
   a power piston positioned adjacent the vacuum boosting device;
   a pair of hydraulic chambers defined at front and rear sides of the power piston to form the hydraulic boosting device together with the power piston; and
   a fluid communication passage providing communication between the pair of hydraulic chambers of the hydraulic boosting device, the valve means being controlled to open the fluid communication passage when the pressure differential between the constant pressure chamber and the variable pressure chamber is within the predetermined value and to close the communication passage when the pressure differential between the constant pressure chamber and the variable pressure chambers exceeds the predetermined value.

6. The hydraulic pressure brake device according to claim 2, wherein the master cylinder piston includes a larger diameter portion at one end of the vacuum boosting device, a pair of hydraulic chambers provided at front and rear ends of the larger diameter portion to form the hydraulic boosting device and a communication passage in fluid communication with the pair of hydraulic chambers, the valve means opening the communication passage when the pressure differential between the constant pressure chamber and the variable pressure chambers is within the predetermined value and closing the communication passage when the pressure differential exceeds the predetermined value.

7. The hydraulic pressure brake device according to claim 2, further comprising:

a power piston positioned adjacent the vacuum boosting device;

a pair of hydraulic chambers defined at front and rear sides of the power piston to form the hydraulic boosting device together with the power piston; and a fluid communication passage providing communication between the pair of hydraulic chambers of the hydraulic boosting device, the valve means being controlled to open the fluid communication passage when the pressure differential between the constant pressure chamber and the variable pressure chamber is within the predetermined value and to close the communication passage when the pressure differential between the constant pressure chamber and the variable pressure chambers exceeds the predetermined value.

8. The hydraulic pressure brake device according to claim 7, wherein the second force transmitting element is integrally formed with the power piston and wherein the communication passage is formed in the power piston.

9. The hydraulic pressure brake device according to claim 1, wherein the detecting means includes a brake pedal operation sensor for detecting the operation amount of the brake pedal, with operation of the pump means being stopped when the brake pedal operation sensor outputs a signal indicating the brake pedal operation amount being less than a predetermined value and the pump means being driven when the brake pedal operation sensor outputs a signal indicating the brake pedal operation amount is greater than the predetermined value.

10. The hydraulic pressure brake device according to claim 2 or 3, further comprising a pressure sensor for detecting the pressure in the variable pressure chamber of the vacuum boosting device and comparing the detected pressure with a predetermined value, with operation of the pump means being stopped when the detected pressure is within the predetermined value and the pump means being driven when the detected pressure exceeds the predetermined value.

11. A hydraulic pressure brake, comprising:

a master brake cylinder that includes a master cylinder piston and a pressure chamber for outputting hydraulic brake pressure in response to a brake pedal operation;

a vacuum boosting device which performs a vacuum boosting operation up to a boosting limit to boost an operation of the master cylinder piston in response to the brake pedal operation;

a pump for outputting hydraulic brake pressure independently of the master brake cylinder;

a hydraulic boosting device which performs hydraulic boosting operation to boost the operation of the master cylinder piston by the hydraulic pressure output from the pump;

detecting means for detecting a condition of at least one of the vacuum boosting device and the brake pedal;

a valve prohibiting the hydraulic boosting operation by the hydraulic boosting device during the vacuum boosting operation when the vacuum pressure is less than the boosting limit of the vacuum boosting device and for allowing the hydraulic boosting operation by the hydraulic boosting device when the vacuum pressure by the vacuum boosting device reaches the boosting limit of the vacuum boosting device; and said pump being driven based on the condition detected by the detection means.

12. The hydraulic pressure brake device according to claim 11, wherein the vacuum boosting device includes a housing in which is positioned a movable wall dividing an interior of the housing into a constant pressure chamber adapted to be connected to a vacuum source and a variable pressure chamber adapted to be communicated with atmospheric pressure, a control valve movable with the movable wall for controlling communication between the variable pressure chamber and the atmospheric pressure and for controlling communication between the variable pressure chamber and the constant pressure chamber in response to the brake pedal operation, and driving means for driving the master cylinder piston in response to a pressure differential between the constant pressure chamber and the variable pressure chamber.

13. The hydraulic pressure brake device according to claim 12, wherein the hydraulic pressure brake device includes a first force transmitting element disposed between the brake pedal and the piston of the master cylinder, and a second force transmitting element transmitting the driving of the driving means to the piston of the master cylinder in response to the pressure differential between the constant and variable pressure chambers, the valve being controlled in response to a position of the first force transmitting element relative to the second force transmitting element, the valve prohibiting the hydraulic boosting operation when the pressure differential is within a predetermined value and allowing hydraulic boosting operation when the pressure differential exceeds the predetermined value.

14. The hydraulic pressure brake device according to claim 13, including an elastic element disposed between the second force transmitting element and the driving means, the first force transmitting element being directly connected to the brake pedal and bypassing the elastic element.

15. The hydraulic pressure brake device according to claim 14, wherein the piston of the master cylinder includes a larger diameter portion at one end of the vacuum boosting device, a pair of hydraulic chambers provided at front and rear ends of the larger diameter portion to form the hydraulic boosting device and a communication passage in fluid communication with the pair of hydraulic chambers, and the valve opening the communication passage when the pressure differential between the constant pressure chamber and the variable pressure chambers is within the predetermined value and closing the communication passage when the pressure differential exceeds the predetermined value.

* * * * *